Jan. 26, 1937.    A. J. FISHER ET AL    2,069,032
DIVISION MOLDING ASSEMBLY FOR A WINDSHIELD
Filed Jan. 18, 1936    3 Sheets-Sheet 1

INVENTORS
Alfred J. Fisher
Emory Glenn Simpson
BY
Barnes, Kisselle, Laughlin & Raisch
ATTORNEYS

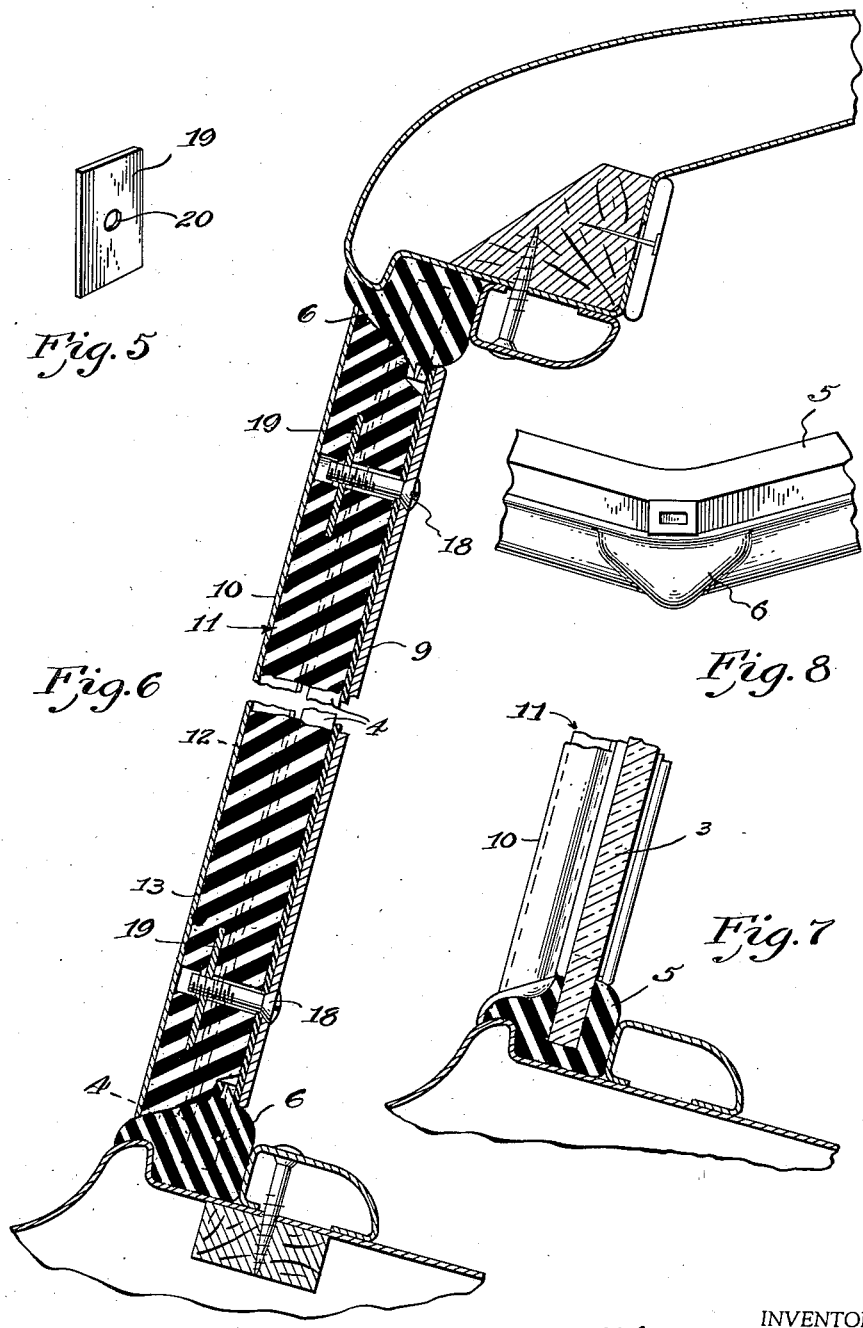

Patented Jan. 26, 1937

2,069,032

UNITED STATES PATENT OFFICE 2,069,032

DIVISION MOLDING ASSEMBLY FOR A WINDSHIELD

Alfred J. Fisher and Emory Glenn Simpson, Detroit, Mich., assignors to General Motors Corporation, Detroit, Mich., a corporation of Delaware Application January 18, 1936, Serial No. 59,670

7 Claims. (Cl. 296—93)

This invention relates to a division molding assembly for a windshield.

It is an object of this invention to produce a molding assembly for effectively sealing a window glass panel and more particularly for effectively sealing the joint which occurs between the adjacent vertical edges of the glass panels forming a V type windshield for an automobile.

In an automotive vehicle the strains and stresses placed upon the body during fabrication and use cause a certain amount of body weave or distortion which has resulted in the breaking of window glass panels. It is an object of this invention to produce a window glass molding assembly which will effectively seal the window glass joint against rain and weather and which is sufficiently flexible to give the window glass a limited floating mounting and thereby prevent glass breakage due to this body distortion or weave.

In the drawings:

Fig. 5 is a detail of an anchor plate for anchoring the decorative metal molding and rubber weatherstrip to the inside retaining plate.

Fig. 6 is a section along the line 6—6 of Fig. 1.

Fig. 7 is a section along the line 7—7 of Fig. 1.

Fig. 8 is a detail of the windshield frame weatherstrip.

Figure 1:
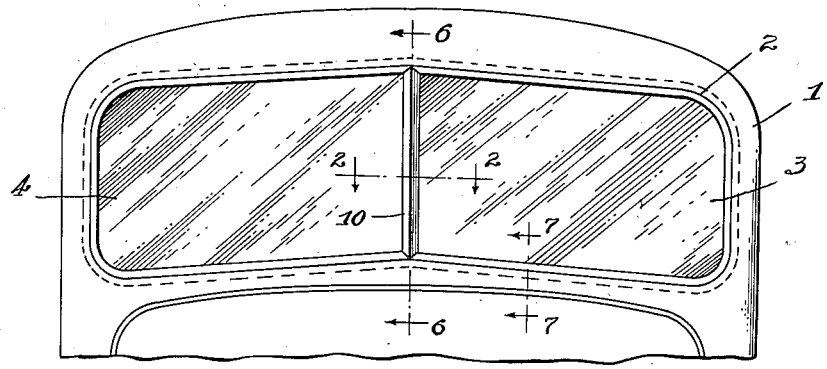
Fig. 1 is a fragmentary front elevation of an automotive vehicle body showing a V windshield and the division molding assembly.
Figure 2:
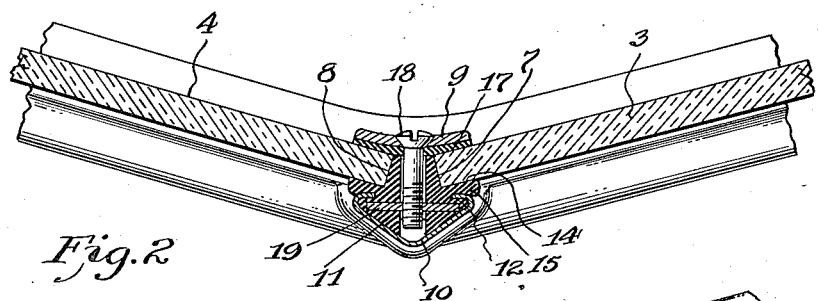
Fig. 2 is a section along the line 2—2 of Fig. 1.
Figure 3:
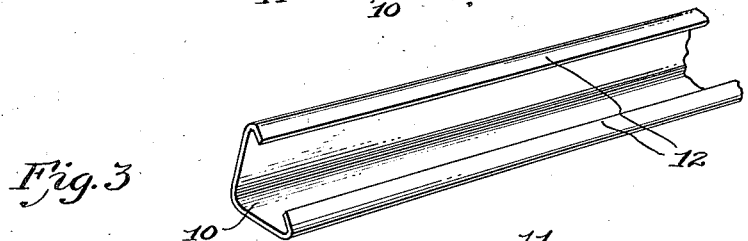
Fig. 3 is a perspective of the decorative metal molding.

Referring more particularly to the drawings there is shown an automobile body 1 having a windshield frame 2 in which is mounted the glass panels 3 and 4 which comprise the V windshield. The joint between the outer edges of the panels 3 and 4 and the windshield frame 2 are sealed by a rubber weatherstrip 5 in the form of a channel. The rubber weatherstrip channel 5 extends completely around the window opening. The rubber channel 5 is provided with a web 6 which extends across the channel groove from one upstanding lip to the other between the adjacent vertical edges 7 and 8 of the glass panels 3 and 4 respectively. This web seals the extreme lower and upper portions of the joint between the adjacent vertical edges 7 and 8 of the windshield glass panels.

For sealing the joint extending between the vertical edges 7 and 8 from the top to the bottom of the windshield frame 2 it is proposed to use a flexible division molding assembly. Such a molding assembly must effectively seal this joint against the weather, be flexible enough to permit a limited relative movement between the glass panels 3 and 4 and yet securely bind the two panels together. These objects have been achieved by fabricating the division molding assembly from inner and outer metal members 9 and 10 with an intermediate rubber sealing member 11. The outer molding 10 preferably comes in the form of a flexible V-section sheet metal channel having its edges inwardly turned as at 12 to provide retainer flanges as described below. The outer face of the molding 10 may be chromium plated or otherwise suitably finished.

Figure 4:
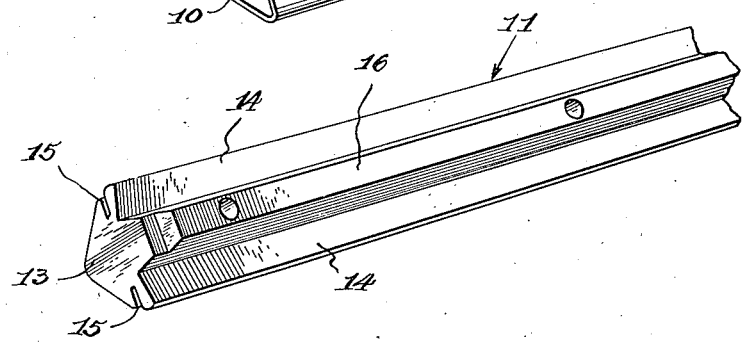
Fig. 4 is a detail of the molded rubber weatherstrip.
Figure 9:
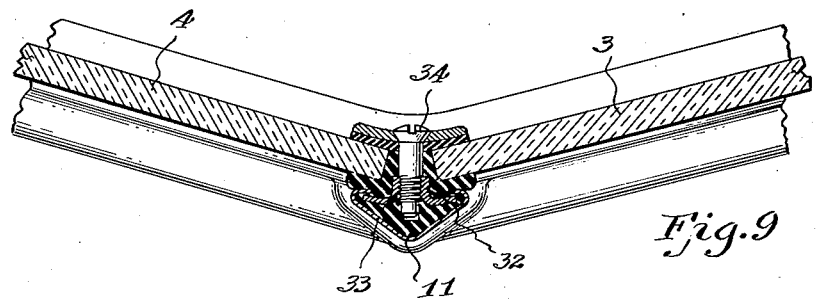
Fig. 9 is a horizontal section through the windshield showing a modified form of the division molding.
Figure 10:
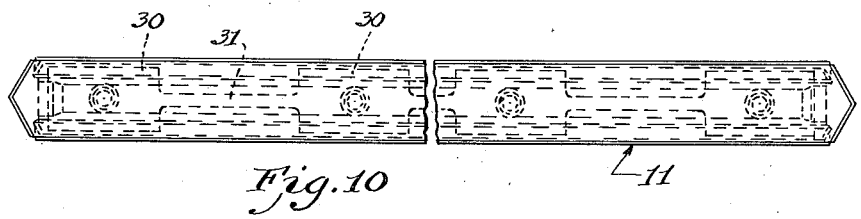
Fig. 10 is an assembly view of the outside portion of the modified form of the division molding.
Figure 11:
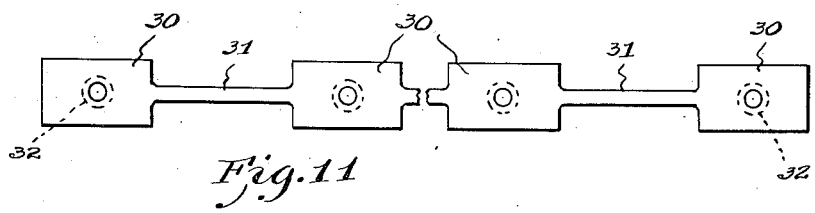
Figs. 11 and 12 are details of the anchor plate for the modified form of the division molding.
Figure 12:
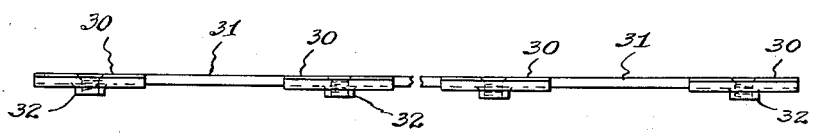

As shown in Fig. 4 the weatherstrip 11 preferably comprises a molded homogeneous rubber strip having a V-section portion 13 which conforms to, and fits inside the molding 10, a pair of lips 14 which are spaced from the V-section to form longitudinal grooves 15 for receiving the flanges 12 of the molding 10, and a rib 16 which projects inwardly between the vertical edges 7 and 8 of the glass panels to seal the same.

The inside metal retainer strip 9 may be grained or otherwise suitably finished. A rubber or fabric strip 17 is positioned between the inside strip 9 and the glass panels 3 and 4. The metal molding 10 and strip 9 are preferably made from thin gauge metal so that they are flexible. Preferably the molded member 10 is made from thin gauge stock so that it alone may be easily flexed manually and even digitally. At the same time the channel section of the molding 10 gives it considerable strength in view of the thin gauge stock from which it is made.

To attain the flexibility of the division molding assembly and at the same time effectively secure the inside retainer strip 9 to the molding 10 and weatherstrip 11, these members are secured together by a plurality of screws 18 and anchor plates 19 which preferably are molded in the rubber strip 11. The anchor plates 19 are provided with tapped openings 20 for receiving the threaded end of the screws 19. The length of each anchor plate 19 is no greater than necessary to secure it within the rubber strip 11 and molding 10 and to obtain a secure tie between the retainer 9 and the molding 10 and weatherstrip 11. The length of the anchor plates 19 will vary, those used herein are about one inch long and the distance between the anchor plates will likewise vary to suit the conditions obtaining. However, the point is that the anchor plates should be spaced a sufficient distance apart to permit secure anchoring of the molding assembly to the glass panels 3 and 4 and yet at the same time leave the molding assembly flexible.

In assembling the molding assembly to the windshield glass panels the molding member 10 is slipped on to the rubber weatherstrip with the flanges 14 sliding in the grooves 15. The rubber strip 11 may be soaped or otherwise lubricated to facilitate sliding the molding 10 thereon. It will be noted that the anchor members 19 are positioned on the inside of the flanges 12 so that the flanges 12 retain the anchor plates within the molding 10. The rubber rib 16 engages between the vertical edges 7 and 8 of the glass panels and the lips 14 engage between the edge portions of the outer face of the panels and the turned in flanges 12 of the molding 10. The screws 18 are then threaded into the anchor plates 19 and turned down to tightly secure the entire assembly in sealing relation with the panels 3 and 4. It is evident that the molding assembly will effectively seal the joint between the panels and yet be flexible enough to permit a limited movement of the windshield panels thereby preventing glass breakage.

Referring to Figs. 9 through 12, there is shown a modified form of the division molding. The modified form of division molding is the same as the principal form except that different anchor plates are integrated. This modified anchor plate comprises a single strip of metal having a plurality of plate portions 30 which are tied together by integral thin strips of metal 31. Each plate portion is embossed as at 32 and the embossment internally threaded as at 33 for receiving the screw 34. This anchor strip is molded in the rubber weatherstrip 11 the same as the anchor plates 19. The connecting strips 31 positively space the plates 30 and prevent any slipping of the plates 30 one toward the other either during the molding operation or thereafter. This positive spacing of the plates 30 by the thin strips 31 necessarily insures positive and accurate spacing of the screw holes 32 and thus facilitates the assembly of the entire division molding to the window glass panels. The strip portions 31 are relatively narrow and thin and consequently when the anchor strip is molded in the rubber weatherstrip 11 the assembly is easily flexed and bent.

In the principal, as well as in the modified form of the above described division molding, flexibility of the molding is assured and thereby relative movement of the adjoining glass panels and the window frame is permitted and breakage of the window glasses prevented.

I claim:

1. In an automotive vehicle having a window opening and a pair of glass panels mounted in the window opening to form a closure and having their adjacent edges spaced to form a gap, a flexible window seal for sealing the adjacent edges of the said window glass panels and closing the said gap comprising a distortable rubber weatherstrip having a rib portion positioned in the said gap and lip portions overlapping and sealing against the edges of the panels, an outer molding in the form of a manually flexible metal channel having inwardly turned lips in interlocking engagement with said weatherstrip, a plurality of anchor plates positioned within the channel and molded in the said rubber weatherstrip at spaced intervals, and means passing through the inside retainer plate, weatherstrip and anchor plates for binding the said members together and to the window panels.

2. In an automotive vehicle having a window opening and a pair of glass panels mounted in the window opening to form a closure and having their adjacent edges spaced to form a gap, a flexible window seal for sealing the adjacent edges of the said window glass panels and closing the said gap comprising a distortable rubber weatherstrip having a rib portion positioned in the said gap and lip portions overlapping the edges of the panels, the said weatherstrip also having a portion arranged to fit within the outer molding and having a longitudinal groove on each side for interlocking engagement with the inturned lips of the outer molding channel, an outer molding in the form of a manually flexible metal channel having inwardly turned lips, a plurality of anchor plates molded in the said weatherstrip and positioned within the said channel behind the inwardly turned lips at spaced intervals, and means passing through the inside retainer plate, weatherstrip and anchor plates for binding the said members together and to the window panels.

3. In an automotive vehicle having a window opening and a pair of glass panels having their adjacent edges spaced to form a gap and forming a closure for the said window opening, a flexible window seal comprising a distortable rubber weatherstrip having a rib portion positioned in and filling the said gap and engaging the edges of the said glass panels to seal the same and a pair of lips overlapping and sealing against the outer faces of the glass panels, a plurality of anchor plates molded into the rubber weatherstrip at spaced intervals having threaded openings arranged to receive screws passing through the inside retainer strip and weatherstrip, an inside retainer strip positioned on the inside of the panels and overlapping the panels on each side of the gap, an outside molding in the form of a thin, flexible metal V channel having its lips turned inwardly into the weatherstrip for tying the molding to the weatherstrip and locking the anchor plates within the molding, screws passing through the inside retainer plate and gap between the window panels and into the anchor plates for drawing the weatherstrip assembly into a weather-tight sealing engagement with the window panels.

4. In an automotive vehicle having a window opening and a pair of glass panels having their adjacent edges spaced to form a gap and forming a closure for the said window opening, a flexible window seal comprising a distortable soft rubber weatherstrip having a rib portion positioned in and filling the said gap and engaging the edges of the said glass panels to seal the same, the said weatherstrip having a V shaped portion extending along the outside of the gap and overlapping the edge portions of the window glass panels on each side of the gap, the said V portion having a groove extending along each side, a plurality of anchor plates molded into the rubber weatherstrip at spaced intervals within the outside molding having threaded openings, a thin metal retainer strip positioned on the inside of the panels and overlapping the panels on each side of the gap, a thin manually flexible V channel molding positioned over the said weatherstrip and having inwardly turned lips in interlocking engagement with the said weatherstrip in the said grooves for tying the molding to the weatherstrip and locking the anchor plates within said molding, and screws passing through the inside retainer plate and gap between the window panels and into the threaded openings of the anchor plates for drawing the inside retainer strip, rubber weatherstrip and molding into a weathertight sealing engagement with the window panels.

5. In an automotive vehicle having a window opening and a pair of glass panels mounted in the window opening to form a closure and having their adjacent edges spaced to form a gap, a flexible window seal for sealing the adjacent edges of the said window glass panels and closing the said gap comprising a distortable rubber weatherstrip having a rib portion positioned in the said gap and lip portions overlapping the edges of the panels, an outer molding in the form of a manually flexible metal channel having inwardly turned lips in interlocking engagement with said weatherstrip, a plurality of anchor plates positioned within the channel, means for positively holding the anchor plates in spaced relation, and means passing through the inside retainer plate, weatherstrip and anchor plates for binding the said members together and to the window panels 6. In an automotive vehicle having a window opening and a pair of glass panels mounted in the window opening to form a closure and having their adjacent edges spaced to form a gap, a flexible window seal for sealing the adjacent edges of the said window glass panels and closing the said gap comprising a distortable rubber weatherstrip having a rib portion positioned in the said gap and lip portions overlapping the edges of the panels, an outer molding in the form of a manually flexible metal channel having inwardly turned lips in interlocking engagement with said weatherstrip, a plurality of anchor plates positioned within the channel and molded in the said rubber weatherstrip at spaced intervals, spacers for positively spacing the said anchor plates in the form of a thin elongated strip of metal fixed to and between the said anchor plates, and means passing through the inside retainer plate, weatherstrip and anchor plates for binding the said members together and to the window panels.

7. In an automotive vehicle having a window opening and a pair of glass panels mounted in the window opening to form a closure and having their adjacent edges spaced to form a gap, a flexible window seal for sealing the adjacent edges of the said window glass panels and closing the said gap comprising a distortable rubber weatherstrip having a rib portion positioned in the said gap and lip portions overlapping the edges of the panels, an outer molding in the form of a manually flexible metal channel having inwardly turned lips in interlocking engagement with said weatherstrip, an anchor plate positioned within the channel and molded in the said rubber weatherstrip, the said anchor plate comprising a single strip of metal having a plurality of wide portions provided with threaded openings and interconnected by elongated narrow portions and screws passing through the inside retainer plate, weatherstrip and threaded openings in the anchor plate for binding the said members together and to the window panels.

ALFRED J. FISHER.
EMORY GLENN SIMPSON.